3,247,159
HIGH CLARITY POLYETHYLENE
James W. Pendleton, South Charleston, and Joy C. Hodges, Chesapeake, W. Va., assignors to Union Carbide Corporation, a corporation of New York
No Drawing. Filed Mar. 14, 1962, Ser. No. 179,771
3 Claims. (Cl. 260—41)

This invention relates to polyethylene compositions showing improved optical properties when converted into film. More particularly, this invention relates to polyethylene compositions modified with exceptionally small and critical amounts of carbon blacks or graphite.

The use of polyethylene in the production of film is well known. However, one of the problems has been the production of polyethylene film of high clarity having a low haze, high gloss, high see-through, and a low "milkiness" or "smokiness." While most of the properties have been improved to some extent, it has not been possible to obtain polyethylene films having the low milkiness desired in films.

Lack of all the desirable optical properties has been explained by the presence of microgel particles in the resin, or high molecular weight molecules in the resin, or the presence of spherulites. Many attempts have been made to overcome the problems due to these causes as, for example, smoothing the surface of the film by passing between highly polished rolls, mixing the polymer under high shear conditions between two rolls rotating at different speeds, and other mechanical means. However, in no instance have these treatments fully resolved the problem. It has also been suggested that the optical properties can be improved by extrusion of the polymer through a narrow orifice under high pressures to degrade the larger polymer molecules and thus produce a film with a smoother surface. In addition, polymers have been modified by the incorporation of various additives during the polymerization in attempts to improve the optical properties of film produced therefrom. These methods have also been only partially successful.

In the past carbon black has been added to polyethylene to improve the light stability and as a filler to improve the mechanical properties of the polymer. The concentrations heretofore used have normally ranged from about 1 to about 50 percent or more by weight of carbon black in the polymer composition, and the compositions so produced have in all instances been black in color.

It has now been found that critical trace amounts of carbon black can be added to polyethylene to produce clear, colorless compositions having exceptionally desirable optical properties including low milkiness. This is accomplished by the addition of from about 1 to about 50 parts per million, preferably of from about 2 to about 25 parts per million, and most preferably from about 3 to about 10 parts per million, of carbon black to polyethylene. The discovery that these concentrations of carbon black improve the optical properties while at the same time not imparting a black or grey color to the polymer was unexpected and unobvious and could not be predicted or explained from the known prior art.

The polyethylenes which can be used to produce the polymer composition of this invention are those polyethylenes having densities of from about 0.91 to about 0.975 gram per cc. as determined by the method described in ASTM D1505–57, with melt indices known in the art as being suitable for use in film production. These polymers are well known and so are the procedures by which they can be produced.

The particle size of the carbon black or graphite can vary from about 0.005 micron up to about 10 microns or more, and is preferably within the range of from about 0.1 to about 5 microns, with the average particle size of the carbon black employed being preferably in the range of about 0.1 micron.

The carbon black compound can be added to the polyethylene by any of the known procedures. Thus, for example, the desired amount can be metered into the polyethylene and the mixture then treated so as to disperse the carbon black uniformly throughout the composition. A preferred procedure, however, is to prepare a master batch containing about 0.1 percent by weight of carbon black in the polyethylene and then evenly dispersing this master batch throughout the polyethylene composition. Master batches containing higher concentrations of carbon black can also be used if desired. Preferably the resin used in preparing the master batch is the same resin to which the master batch is to be added to improve its optical properties.

The mixing of both the master batches and the compositions of this invention can be carried out by compounding in a Banbury mixer and roll mill or in a roll mill alone by procedures that are known in the art. One of the simplest ways is to hot mill the resin and add the proper amount of the master batch to the molten polyethylene for further mixing. At the same time small concentrations of additives such as slip agents, antioxidants, antiblock agents, stabilizers, fillers, and so forth, can also be added. The homogeneous composition is then recovered in pellet, granular, or powder form or can be used directly to produce film or molded or extruded articles.

When compared to resins without the critical concentrations of carbon black herebefore specified, extruded films containing the concentrations of carbon black as defined by this invention are less milky (smoky) in visual appearance and yield lower instrumental haze, gloss, and see-through values. The milkiness of the film may be measured instrumentally; however, visual measurement is adequate since milkiness is readily discernible by comparison. The haze values were determined according to ASTM D1003–52 and the gloss values according to ASTM D523–53T. See-through is defined as the percent total light, which after passing through a film sample, is deviated less than plus or minus 0.07 degree from the incident beam. Measurements are conducted with a specular transmission instrument; see-through, by this instrument measurement, is approximately equivalent to AMA see-through distances in the range of 5 to 60 feet. The latter method is a visual test employing a standard AMA eye chart. Measurements are conducted by holding a piece of film about 1 foot in front of the eyes, and determining the maximum distance in feet (chart to film) at which the 20/30 line on the eye chart can be distinguished, under proper illumination.

The following examples further serve to define the invention but should not be construed to limit it thereto.

*Example 1*

A master batch was prepared by milling 0.125 percent by weight of a carbon black having an average particle size of about 0.1 micron with a polyethylene base resin having a melt index of 2.0 dgm./min. and a density of 0.922 grams/cc. One part of this master batch was compounded with 199 parts of the same base resin to give a polyethylene composition containing 6 parts per million of carbon black. The compounding was carried out at 105° C. on a roll mill for two minutes with the carbon black master batch having been added to the base resin after the base resin had reached the molten state. After thorough milling the uniform composition was sheeted from the mill and granulated. The granules were then extruded by the conventional tubular film process to produce film of about 1.5 mils thickness.

For control purposes a sample of the same base resin was treated in the same manner but without any added carbon black and extruded to film form. The films produced from the two polyethylene compositions were then compared for optical properties. The carbon black-containing composition was visually less smoky than the control sample. The other optical properties are summarized below.

|  | Control | Carbon-Containing Composition |
|---|---|---|
| Haze, percent | 4.2 | 2.7 |
| Gloss, percent | 146 | 164 |
| See-through, feet | 42 | 56 |

From the data obtained it was clearly evident that a concentration of 6 parts per million of carbon black in the polyethylene appreciably improved the optical properties and decreased the smokiness of films produced from the polymer.

*Example 2*

Polyethylene compositions were produced in a manner similar to that described in Example 1 using a polyethylene base resin having a density of 0.953 gram/cc. and a melt index of 3.4 dgm./min. A control was also prepared by treating the polymer under the same reaction conditions but in the absence of carbon black. All of the polyethylene samples were extruded into films and it was found that those samples containing carbon black had a lower milkiness by visual comparison than the control sample, and in addition, they had improved haze and gloss values. The haze and gloss values are tabulated below.

| Parts Per Million Carbon | Haze, Percent | 45° Gloss | 60° Gloss |
|---|---|---|---|
| 0 | 14 | 76 | 120 |
| 6 | 12 | 81 | 120 |
| 12 | 10 | 85 | 130 |
| 18 | 9 |  | 120 |

*Example 3*

In a manner similar to that described in Example 1, polyethylene compositions were produced containing varying amounts of carbon black. The polyethylene base resin employed had a density of 0.95 g./cc. and a melt index of 6.3 dgm./min. A control was prepared free of carbon in which the base resin was treated under the same conditions. Those compositions containing carbon black were free of milkiness by visual observation whereas the control possessed considerable milkiness. The results on the other optical properties are tabulated below.

| Parts Per Million Carbon | Haze, Percent | Gloss 45° | Gloss 60° | See-through, Percent |
|---|---|---|---|---|
| 0 | 19 | 64 | 94 | 53 |
| 6 | 21 |  | 94 | 50 |
| 18 | 22 | 62 | 99 | 48 |
| 30 | 16 | 80 | 109 | 52 |

*Example 4*

A master batch was prepared containing about 30 percent by weight carbon black. One gram of this original master batch was compounded on a roll mill at 113° C. with 199 grams of polyethylene having a density of 0.939 gram/cc. and a melt index of 1.2 dgm./min. to produce a homogeneous mixture. One half-, one-, and two-gram portions of this diluted master batch were compounded by milling for two minutes after fluxing at 113° C. with sufficient polyethylene to produce 200 gram batches. There were thus obtained three polyethylene compositions containing 3.75, 7.5 and 15 parts per million carbon black, respectively. A control sample, without carbon black, was also milled under the same conditions. The four polyethylene compositions were then extruded by the tubular process to produce a thin film. The films produced from the polyethylene compositions containing the carbon black were visually free of milkiness; the control had a decided milky appearance. The results on the other optical properties are listed below.

| Parts Per Million Carbon | Haze, Percent | 60° Gloss | See-through, Percent |
|---|---|---|---|
| 0 | 7.7 | 127 | 40 |
| 3.75 | 3.4 | 154 | 42 |
| 7.5 | 4.0 | 150 | 42 |
| 15 | 5.1 | 148 | 40 |

*Example 5*

In a manner similar to that described in Example 4, a polyethylene having a density of 0.939 gram/cc. and a melt index of 0.93 dgm./min. was compounded with various concentrations of carbon black. A control sample was physically treated in the same manner. Films produced from those samples containing carbon black were free of any smoky apearance whereas the control sample had a decided smoky look. The results on the other optical properties are tabulated below.

| Parts Per Million Carbon | Haze, Percent | 60° Gloss | See-through, Percent |
|---|---|---|---|
| 0 | 6.3 | 133 | 39 |
| 1.9 | 5.7 |  |  |
| 3.75 | 5.6 | 136 | 40 |
| 7.5 | 5.3 |  | 42 |
| 15 | 7.7 |  | 38 |

*Example 6*

In a manner similar to that described in Example 4, but at a temperature of 105° C., carbon black-containing compositions were produced using a polyethylene having a density of 0.939 gram/cc. and a melt index of 3.0 dgm./min. The carbon-containing compositions produced films free of milky appearance whereas the control sample was decidedly milky. The other optical properties are tabulated below.

| Parts Per Million Carbon | Haze, Percent | 60° Gloss |
|---|---|---|
| 0 | 5.4 | 152 |
| 7.5 | 5.0 | 154 |
| 15 | 3.5 | 160 |

While the numerical differences in haze, gloss, or see-through reported in the above examples may appear minor in nature, it is to be noted that a small difference in the numerical value represents an appreciable difference in the visually observed properties of the polyethylene films.

What is claimed is:

1. A homogeneous composition of high clarity polyethylene and from 2 to about 25 parts per million, based on the total weight of said composition, of carbon black in finely divided micron size.

2. A homogeneous composition of high clarity polyethylene and from 2 to 25 parts per million, based on the total weight of said composition, of carbon black of from 0.005 micron to 10 microns in size.

3. A homogeneous composition of high clarity polyethylene and from 3 to 10 parts per million, based on the total weight of said composition, of carbon black of from 0.01 micron to 5 microns in size.

References Cited by the Examiner

UNITED STATES PATENTS 2,888,424   5/1959   Precopio _____ 260—41
2,991,264   7/1961   Monroe _____ 260—41

MORRIS LIEBMAN, *Primary Examiner.*